(12) United States Patent
Shek et al.

(10) Patent No.: US 12,153,485 B2
(45) Date of Patent: Nov. 26, 2024

(54) IN-BAND COMMUNICATION INTERFACE POWER MANAGEMENT FENCING

(71) Applicant: ATI Technologies ULC, Markham (CA)

(72) Inventors: Chi Yan Herburt Shek, Markham (CA); Kostantinos Danny Christidis, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/372,253

(22) Filed: Jul. 9, 2021

(65) Prior Publication Data

US 2023/0009970 A1    Jan. 12, 2023

(51) Int. Cl.
*G06F 1/00*        (2006.01)
*G06F 1/3228*    (2019.01)
*G06F 1/3296*    (2019.01)

(52) U.S. Cl.
CPC .......... *G06F 1/3296* (2013.01); *G06F 1/3228* (2013.01)

(58) Field of Classification Search
CPC .............................. G06F 1/3296; G06F 1/3228
See application file for complete search history.

(56) References Cited

U.S. PATENT DOCUMENTS

| | | | |
|---|---|---|---|
| 4,980,836 A | 12/1990 | Carter et al. | |
| 5,396,635 A | 3/1995 | Fung | |
| 5,511,203 A | 4/1996 | Wisor et al. | |
| 5,617,572 A | 4/1997 | Pearce et al. | |
| 5,692,202 A | 11/1997 | Kardach et al. | |
| 6,334,167 B1 | 12/2001 | Gerchman et al. | |
| 6,657,534 B1 | 12/2003 | Beer et al. | |
| 6,657,634 B1 | 12/2003 | Sinclair et al. | |
| 7,028,200 B2 | 4/2006 | Ma | |
| 7,085,941 B2 | 8/2006 | Li | |
| 7,293,165 B1 * | 11/2007 | Tobias | G06F 8/66 713/1 |
| 7,428,644 B2 | 9/2008 | Jeddeloh et al. | |
| 7,437,579 B2 | 10/2008 | Jeddeloh et al. | |
| 7,496,777 B2 | 2/2009 | Kapil | |
| 7,613,941 B2 | 11/2009 | Samson et al. | |

(Continued)

OTHER PUBLICATIONS

International Search Report and Written Opinion in International Application No. PCT/US2018/051916, mailed Jan. 31, 2019, 10 pages.

(Continued)

*Primary Examiner* — Mohammed H Rehman
(74) *Attorney, Agent, or Firm* — Kowert, Hood, Munyon, Rankin & Goetzel, P.C.; Rory D. Rankin

(57) ABSTRACT

An apparatus and method for providing efficient power management for data transfer protocols between components. A source generates requests and a destination services the requests. The source and destination support a communication protocol that includes both a transfer channel and one or more transaction channels for each type of request. The source and destination rely on a valid signal and a ready signal of the transfer channels to autonomously manage power consumption. The source and destination remove any dependencies on an external power manager and make it unnecessary to add signal extensions to the communication protocol to support power management.

20 Claims, 8 Drawing Sheets

(56) References Cited

U.S. PATENT DOCUMENTS

| | | |
|---|---|---|
| 7,743,267 B2 | 6/2010 | Snyder et al. |
| 7,783,802 B1 | 8/2010 | Nemazie et al. |
| 7,800,621 B2 | 9/2010 | Fry |
| 7,802,060 B2 | 9/2010 | Hildebrand |
| 7,840,827 B2 | 11/2010 | Dahan et al. |
| 7,868,479 B2 | 1/2011 | Subramaniam |
| 7,873,850 B2 | 1/2011 | Cepulis et al. |
| 7,899,990 B2 | 3/2011 | Moll et al. |
| 8,181,046 B2 | 5/2012 | Marcu et al. |
| 8,402,232 B2 | 3/2013 | Avudaiyappan et al. |
| 8,656,198 B2 | 2/2014 | Branover et al. |
| 8,949,644 B2 | 2/2015 | Ma et al. |
| 9,563,257 B2 | 2/2017 | Fang et al. |
| 11,054,887 B2 | 7/2021 | Tsien et al. |
| 2004/0268170 A1 | 12/2004 | Ayyavu et al. |
| 2006/0271649 A1 | 11/2006 | Tseng et al. |
| 2007/0192437 A1* | 8/2007 | Wang ............ H04W 48/10 709/219 |
| 2009/0187779 A1 | 7/2009 | Liu et al. |
| 2009/0249102 A1* | 10/2009 | Yong ............ G06F 1/3275 713/324 |
| 2011/0083023 A1 | 4/2011 | Dickens et al. |
| 2011/0264934 A1 | 10/2011 | Branover et al. |
| 2012/0117394 A1* | 5/2012 | Lu ............ G06F 1/266 713/310 |
| 2012/0191996 A1 | 7/2012 | Cheong |
| 2012/0254526 A1 | 10/2012 | Kalyanasundharam |
| 2013/0179621 A1 | 7/2013 | Smith et al. |
| 2013/0281148 A1* | 10/2013 | Seyama ............ H04W 52/30 455/522 |
| 2013/0311804 A1 | 11/2013 | Garg et al. |
| 2016/0091939 A1* | 3/2016 | Severson ............ G06F 1/26 713/300 |
| 2017/0353926 A1 | 12/2017 | Zhu et al. |
| 2018/0157311 A1 | 6/2018 | Maisuria et al. |
| 2019/0286456 A1* | 9/2019 | Baker ............ A61M 15/06 |
| 2020/0097062 A1* | 3/2020 | Bazarsky ............ G06F 3/0634 |
| 2022/0057795 A1* | 2/2022 | Katsuki ............ G05D 1/0223 |

OTHER PUBLICATIONS

Yuan et al., "Buffering Approach for Energy Saving in Video Sensors", 2003 International Conference on Multimedia and Expo, Jul. 2003, 4 pages.

"Intel Power Management Technologies for Processor Graphics, Display, and Memory: White Paper for 2010-2011 Desktop and Notebook Platforms", Intel Corporation, Aug. 2010, 10 pages.

International Search Report and Written Opinion in International Application No. PCT/IB2022/056343, mailed Oct. 26, 2022, 11 pages.

* cited by examiner

IN-BAND COMMUNICATION INTERFACE POWER MANAGEMENT FENCING

BACKGROUND

Description of the Relevant Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors. These microprocessors include multiple processor cores, or cores, and multiple pipelines within a core.

A variety of computing devices, such as a variety of servers, utilize heterogeneous integration, which integrates multiple types of ICs for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of ICs. In some computing devices, a system-on-a-chip (SOC) is used, whereas, in other computing devices, smaller and higher-yielding chips are packaged as large chips in multi-chip modules (MCMs). Further, other mechanisms vertically stack and electrically connect two or more dies in a system-in-package (SiP). Regardless of the choice for system packaging, powering down the computing system becomes more complicated.

In view of the above, efficient methods and systems for performing efficient power management for data transfer protocols between components are desired.

Figure 1:
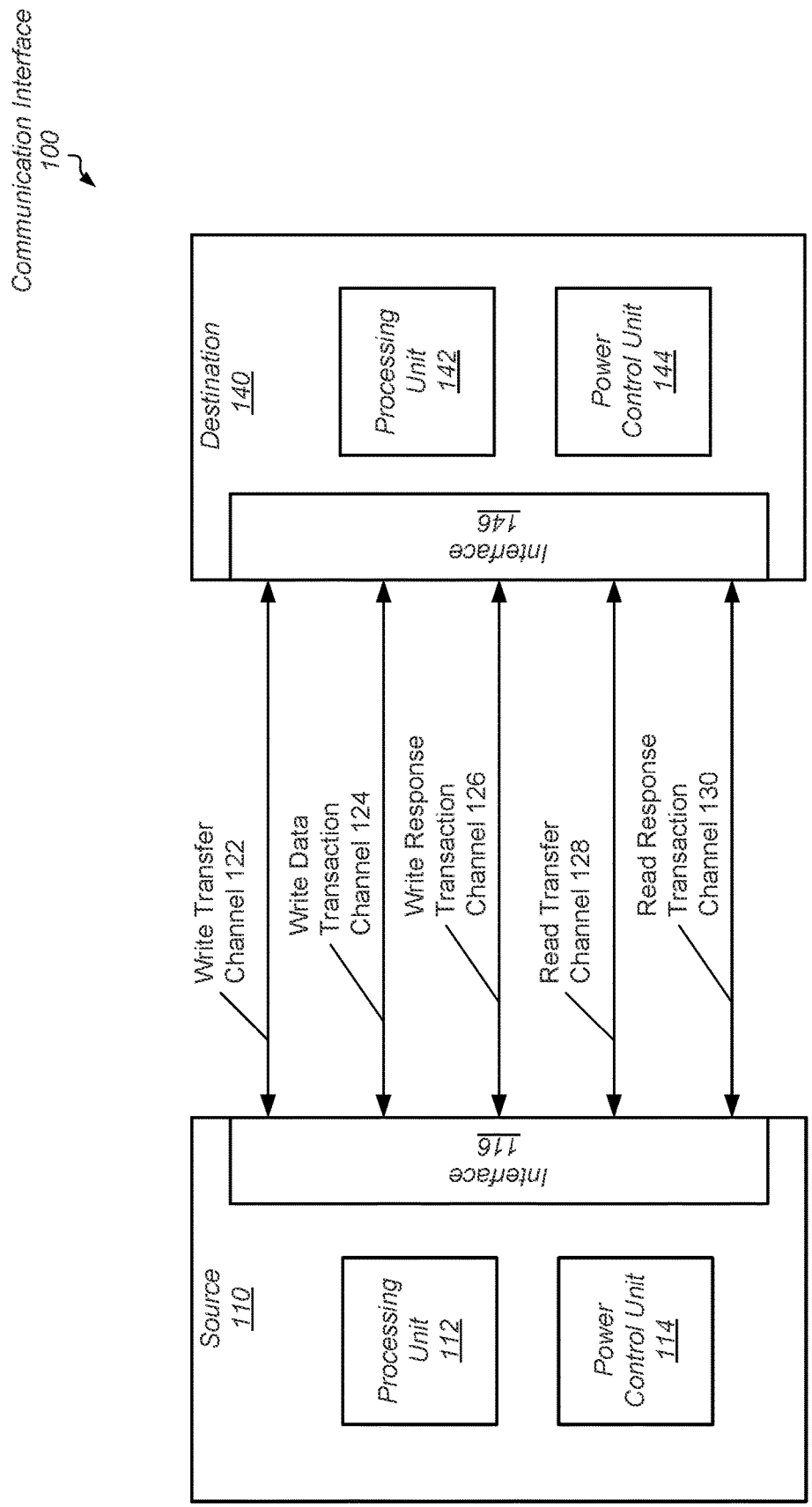
FIG. 1 is a generalized diagram of a communication interface.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for efficient power management for data transfer protocols between components are contemplated. A source generates requests and a destination services the requests. In one implementation, the source is a video decoder and the destination is a hub for a memory controller. In other implementations, the source is one of a variety of types of processing units and the destination is one of a variety of types of endpoints in a computing system. The interfaces of the source and the destination support a communication protocol for signals transferred between them. In some implementations, the communication protocol is the Advanced eXtensible Interface (AXI) protocol of the Arm Advanced Microcontroller Bus Architecture (AMBA) on-chip interconnect specification. It is possible and contemplated that the source and the destination support other examples of communication protocols.

In various implementations, the communication protocol includes both a transfer channel and one or more transaction channels for each type of access request (or request). Types of access requests are read access requests and write access requests. As used herein, a "transfer channel" refers to a channel between the source and the destination that includes control signals used to determine, prior to data targeted by an access request being exchanged between the source and the destination, whether the destination is ready to service the access request. Examples of the control signals are a valid signal and a ready signal. The valid signal indicates whether the source has a request of a particular type ready to be sent to the destination for servicing. The ready signal indicates whether the destination is ready to service the request. In one example, when the write valid signal of the write transfer channel in a state that indicates the source has a write request that is ready to be sent from the source to the destination for servicing, this write valid signal of the write transfer channel is asserted. When the write ready signal of the write transfer channel is in a state that indicates the destination is ready to service a write request, the write ready signal of the write transfer channel is asserted. The control signals of the read transfer channel are asserted in a similar manner.

As used herein, a "transaction channel" refers to a channel between the source and the destination that exchanges (transfers) one or more of the data targeted by the request and a status of completion of the request after the destination indicates on the corresponding transfer channel that the destination is ready to service the request. In one example, write requests use a write transfer channel, a write data transaction channel, and a write response transaction channel. Read requests use a read transfer channel and a read response transaction channel.

In an implementation, the source and the destination support multiple power management states including at least an operational state and a non-operational state. When the destination services requests generated by the source, the destination uses the operational state. In the operational state, the destination uses one of multiple power-performance states (P-states). The P-state includes at least an operating voltage and an operational clock frequency. A higher performance P-state uses a larger operating voltage and a larger operational clock frequency. When the destination does not service requests, the destination uses the non-operational state. In the non-operational state, the destination uses one of the multiple P-states or one of multiple sleep states. A sleep state indicates whether an operating voltage or operating clock frequency is zero, whether power supply generating circuitry is turned off or otherwise disconnected, whether clock generating circuitry is turned off or otherwise disconnected, whether particular state information is maintained, and so on. In deeper sleep states, the destination further reduces power consumption, but also takes longer to wake up and transition to the operational state to be ready to service requests once again. In some implementations, the source and the destination support the power management states of the Advanced Configuration and Power Interface (ACPI) specification. For example, the operational state can be the C0 state of the ACPI specification where one of the multiple P-states are used while servicing requests. The non-operational state can be one of the multiple P-states selected to be a lower performance P-state. Additionally, the non-operational state can be one of the C1, C2, . . . Cn sleep states of the ACPI specification.

When the destination determines that an event has occurred that causes a change in whether the destination services requests, the destination adjusts a state of the destination that includes one of an operational state and a non-operational state by autonomously performing a power up or a power down of the destination. For example, while waiting for requests from the source, when the destination determines an idle condition has occurred the destination autonomously powers down (e.g., to a non-operational state). As used herein, performing an operation, such as a power down or a power up, in an "autonomous" manner refers to performing the operation independently without interaction with an external power manager, a centralized controller, or other similar unit. For example, the destination performs an autonomous power down by having local circuitry select a lower performance power-performance state (P-state) of one or more components of the destination without interacting with an external power manager. In other words, the destination performs this selection without notifying an external power manager or waiting for permission from the external power manager. The destination is also able to perform an autonomous power down by selecting one of multiple sleep states without notifying an external power manager or waiting for permission from the external power manager. In addition, the destination maintains a ready signal of a transfer channel as negated. In other words, the destination maintains the ready signal in a state that indicates the destination is not ready to service a request. Therefore, the source is aware that the destination is not ready to service requests.

One example of the idle condition is the destination determines the valid signals of the transfer channels have been negated for a threshold period of time. A negated valid signal notifies the destination that the source has no request of a particular type to service. When each of the write valid signal of the write transfer channel indicates that the source has no write request to send and the read valid signal of the read transfer channel indicates that the source has no read request to send during the threshold period of time, the destination determines the idle condition has occurred.

The source measures a period of time that both the write ready signal of the write transfer channel and the read ready signal of the read transfer channel remains negated. If the measured period of time reaches a threshold, then the source autonomously reduces the generation of requests to send to the destination. As used herein, the source "fencing" requests to send to the destination refers to the source autonomously reducing the generation of requests to send to the destination. In other words, the source reduces the generation of requests without interaction with an external power manager or other controller.

When the destination is in a non-operational state and determines that a number of received requests exceeds a threshold, the destination determines that a power up condition has occurred. The power up condition is an event that causes a change in whether the destination services requests. When the destination determines the power up condition has occurred, the destination autonomously powers up to the operational state that allows servicing of requests. For example, the destination transitions from a sleep state or a lower performance P-state to a higher performance P-state. In addition, the destination maintains the ready signal of a transfer channel as asserted. In other words, the destination maintains the ready signal in a state that indicates the destination is ready to service a request. By using the control signals, such as the valid signal and the ready signal, of the transfer channels of the communication protocol to manage power consumption, the source and the destination remove any dependencies on an external power manager or other centralized controller and make it unnecessary to add signal extensions to the communication protocol to support power management.

Referring to FIG. 1, a generalized block diagram of one implementation of a communication interface 100 is shown. As shown, communication interface 100 includes a source 110 sending information as electrical signals across channels 122-130 to a destination 140. Similarly, the destination 140 is able to send information as electrical signals across channels 122-130 to the source 110. Therefore, each of interface 116 of the source 110 and the interface 146 of the destination 140 includes multiple transmitters for driving electrical signals and multiple receivers for receiving electrical signals. Each of the source 110 and the destination 140 is representative of any of a variety of functional blocks. In some cases, the source 110 and the destination 140 are within a same die. In other cases, the source 110 and the destination 140 are on separate dies. For example, in an implementation, the source 110 and the destination 140 are individual dies on an integrated circuit (IC), such as a system-on-a-chip (SOC). In other implementations, the source 110 and the destination 140 are individual dies in a system-in-package (SiP) or a multi-chip module (MCM).

The source 110 includes a processing unit 112 and a power control unit 114. Although a single processing unit is shown, it is possible and contemplated that the source includes multiple processing units. The processing unit 112 is representative of a variety of processing units including circuitry of general-purpose processor cores and an on-die cache memory subsystem. Another example of the processing unit 112 includes circuitry of a high parallel data microarchitecture with a significant number of parallel execution lanes. Other examples of the processing unit 112 includes circuitry for an application specific integrated circuit (ASIC), a digital signal processor (DSP), a field programmable gate array (FPGA), and so on. Similarly, examples of the processing unit 142 includes similar circuitry and circuitry for peripheral devices and memory management hubs and modules.

Although five channels 122-130 are shown in the communication interface 100, another number of channels is possible and contemplated. It is noted that the term "channel" can also be referred to as a "bus," and each channel includes multiple transmission lines. As used herein, a "transmission line" can also be referred to as a "lane" or a "trace" or a "wire." Each of the channels 122-130 includes multiple transmission lines. The transmission lines of the channels 122-130 are constructed from a variety of suitable metal sources during semiconductor fabrication and surrounded by a variety of any suitable insulating material.

In various implementations, the source 110 is the initiator of a transaction, or request, and the destination 140 is the completer of the transaction. The channels 122-130 use point-to-point transmission lines between the source 110 and the destination 140, rather than buses where transmission lines have multiple sources capable of driving signals on a particular transmission line. One or more of the multiple wires of a particular one of the channels 122-130 are unidirectional with data being driven from the source 110 to the destination 140.

For write access requests (or write requests or write operations), the source 110 sends information to the destination 140 that includes a target address, write data, and control signals, such as at least a valid signal, that indicate when valid write data is being sent. The destination 140 sends information to the source 110 that includes a response such as an acknowledgment with a status of the write request. The timing of the information sent between the source 110 and the destination 140 is based on a communication protocol supported by the interfaces 116 and 146. Similarly, for read access requests (or read requests or read operations), the source 110 sends information to the destination 140 that includes at least a target address. The destination 140 sends information to the source 110 that includes a response such as read response data and an acknowledgment with a status of the read request. The timing of the information sent between the source 110 and the destination 140 is based on the communication protocol supported by the interfaces 116 and 146.

Each of the interfaces 116 and 146 includes queues for storing requests to service and corresponding responses. The interfaces 116 and 146 also include hardware, such as circuitry, that supports a particular communication protocol for the transmission and reception of signals on the channels 122-130. The communication protocol determines values used for sending information, such as an amount of data being sent per clock cycle, signal voltage levels, signal timings, signal and clock phases and clock frequencies. An example of a communication protocol is the Advanced eXtensible Interface (AXI) protocol of the Arm Advanced Microcontroller Bus Architecture (AMBA) on-chip interconnect specification. It is possible and contemplated that the interfaces 116 and 146 support other examples of communication protocols.

The interfaces 116 and 146 support a set of channels for write operations and a separate set of channels for read operations. With the interfaces 116 and 146 supporting two independent sets of channels for write operations and read operations, the bandwidth, and resulting performance of the communication interface 100, increases. For example, the interfaces 116 and 146 support simultaneous execution of the write operation and the separate read operation. As shown, for write operations, the interfaces 116 and 146 support the write transfer channel 122, the write data transaction channel 124 and the write response transaction channel 126. For read operations, the interfaces 116 and 146 support the read transfer channel 128 and the read response transaction channel 130. As used herein, a "transfer" can refer to a single exchange of information, whereas, a "transaction" can refer to an entire burst of information, containing an address exchange of information, one or more data exchanges of information, and, one or more response exchanges of status information. Examples of the use of a transfer and a corresponding transaction are provided in the upcoming descriptions of signals waveforms 200 and 300 (of FIGS. 2 and 3).

In some implementations, the power control unit 144 of the destination 140 utilizes hardware that selects a respective power-performance state (P-state) for one or more components of the processing unit 142. The P-state includes at least an operating voltage and an operating clock frequency. The power control unit 144 selects the one or more P-states based on determining the status of collected information. Examples of the collected information are predetermined sampled signals during given sample intervals and measurements from on-die current sensors and temperature sensors. An additional example is one of the signals of one or more of the write transfer channel 122 and the read transfer channel 128. The power control unit 144 initiates an autonomous power down of one or more components of the processing unit 142 based on determining an idle condition has occurred. For example, the power control unit 144 autonomously powers down the one or more components of the processing unit 142 to the non-operational state that stops servicing requests. One example of an idle condition is detecting a particular signal of the write transfer channel 122 and the read transfer channel 128 has been negated for a threshold duration (or period) of time. In an implementation, this particular signal is a ready signal of the write transfer channel 122 and the read transfer channel 128 that indicates an operation of a particular type is ready to be serviced by the destination 140.

In some implementations, each of the transfer channels 122 and 128 uses a first signal to indicate the source 110 has a request or operation ready to be serviced by the destination 140. In some examples, this first signal is a valid signal. For example, the write transfer channel 122 includes a write valid signal that, when asserted, indicates the source 110 has a write operation ready to be serviced by the destination 140. Similarly, the read transfer channel 128 includes a read valid signal that, when asserted, indicates the source 110 has a read operation ready to be serviced by the destination 140. When the processing unit 142 of the destination 140 is ready to service an operation, the interface 146 asserts a second signal of a respective one of the transfer channels 122 and 128 to indicate the destination 40 is ready to service an operation. For example, the write transfer channel 122 includes a write ready signal that, when asserted, indicates the destination 140 is ready to service a write operation from the source 110. Similarly, the read transfer channel 128 includes a read ready signal that, when asserted, indicates the destination 140 is ready to service a read operation from the source 110.

When the source 110 receives an asserted ready signal on one of the transfer channels 122 and 128, the source 110 negates the corresponding valid signal. Additionally, the source 110 sends information corresponding to the operation to be serviced to the destination 140. The power control unit 144 detects when one of the write valid signal of the write transfer channel 122 and the read valid signal of the read transfer channel 128 has been negated for a threshold period of time. In response, the power control unit 144 autonomously powers down one or more components of the processing unit 142. For example, the power control unit 144 selects a lower performance P-state for the one or more components of the processing unit 142. Alternatively, the power control unit 144 directs one or more components of the processing unit 142 to transition to an idle or sleep state, and disables one or more clocks signals used by the processing unit 142.

The power control unit 144 performs these steps independently of an external power manager. Therefore, the power control unit 144 performs power management of the destination 140 in a distributed and independent manner, rather than a centralized and dependent manner. Similarly, the power control unit 114 of the source 110 detects when one of the write ready signal of the write transfer channel 122 and the read ready signal of the read transfer channel 128 has been negated for a threshold period of time. In response, the power control unit 114 autonomously reduces the generation of requests to be serviced by the destination 140. In some implementations, the power control unit 114 powers down one or more components of the processing unit 112. For example, the power control unit 114 selects a lower performance P-state for the one or more components of the processing unit 112. Alternatively, the power control unit 144 directs one or more components of the processing unit 112 to transition to an idle or sleep state, and disables one or more clocks signals used by the processing unit 112. By not relying on an external power manager, the power control unit 114 performs power management of the source 110 in a distributed and independent manner, rather than a centralized and dependent manner.

Figure 2:
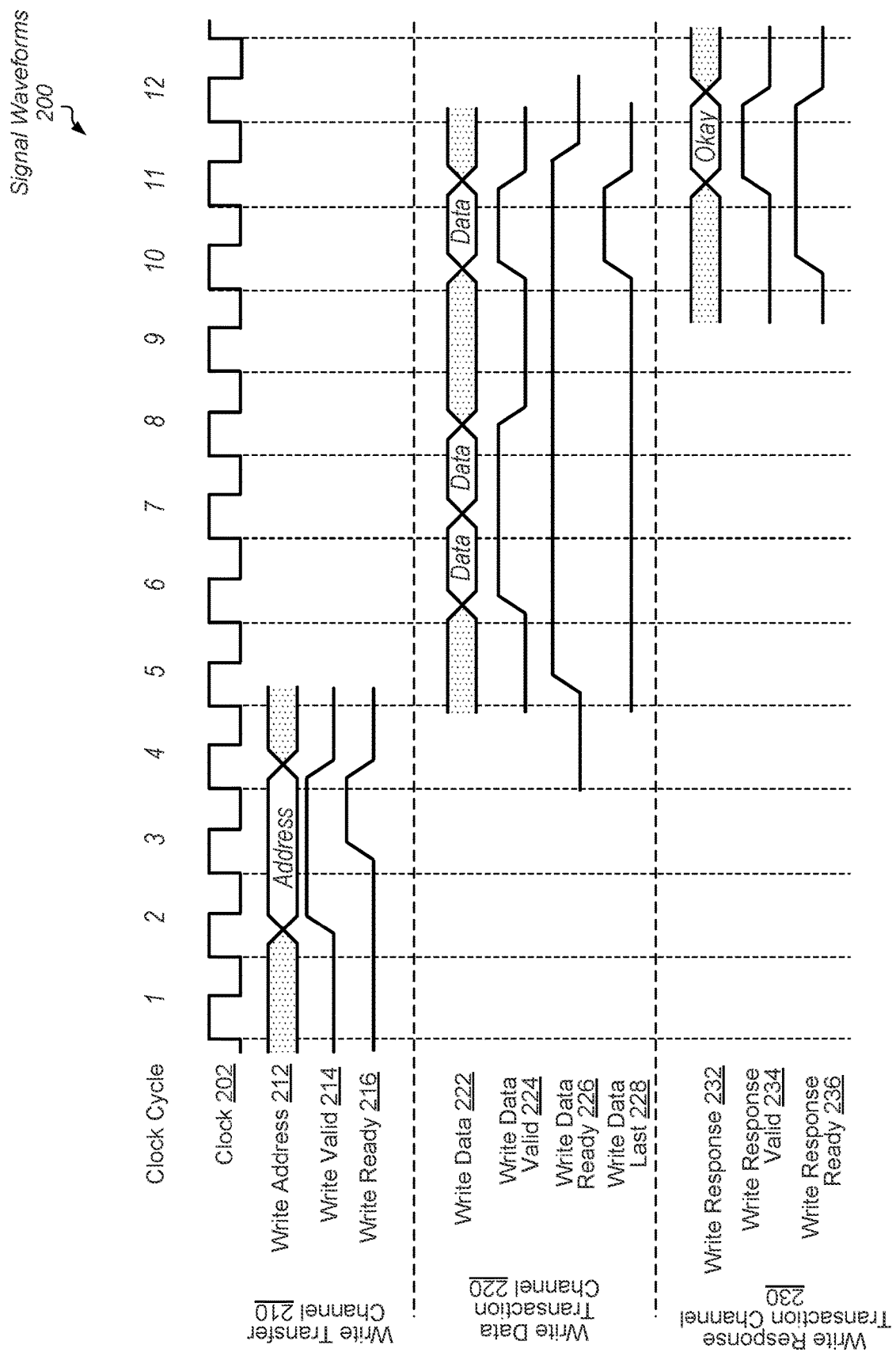
FIG. 2 is a generalized diagram of one implementation of signal waveforms of a write operation according to a communication protocol for channels.

Turning to FIG. 2, a generalized block diagram of one implementation of signal waveforms 200 of a write operation according to a communication protocol for channels is shown. The signal waveforms 200 illustrate signal types and signal transitions supported by a communication protocol implementing write operations between a source (or an initiator) and a destination (or a completer). The clock 202 is a clock signal with a frequency set by the communication protocol and the corresponding clock cycles are used to control timing between events. The signal waveforms 200 include a write transfer channel 210, a write data transaction channel 220, and a write response transaction channel 230. The events of the write data transaction channel 220 and the write response transaction channel 230 are not initiated until the write ready 216 signal of the write transfer channel 210 is asserted.

As used herein, a circuit node or signal line is "asserted" when the node or line stores a voltage level that enables a transistor that receives the voltage level. For example, an n-type transistor is enabled when the n-type transistor receives a positive non-zero voltage level on its gate terminal that is at least a threshold voltage above a voltage level on its source terminal such as a logic high level. As used herein, a Boolean logic high level is also referred to as a logic high level. Similarly, a Boolean logic low level is also referred to as a logic low level. In various implementations, the logic high level is equal to a power supply reference level and the logic low level is equal to a ground reference level. In one example, when the write valid signal of the write transfer channel in a state that indicates the source has a write request that is ready to be sent from the source to the destination for servicing, this write valid signal of the write transfer channel is asserted. When the write ready signal of the write transfer channel is in a state that indicates the destination is ready to service a write request, the write ready signal of the write transfer channel is asserted. The control signals of the read transfer channel are asserted in a similar manner.

As used herein, the circuit node or signal line is "negated," or de-asserted, when the node or line stores a voltage level that disables a transistor that receives the voltage level. An n-type transistor is disabled when the n-type transistor receives a voltage level on its gate terminal that is a threshold voltage below a voltage level on its source terminal such as the logic low level. Similarly, a p-type transistor is enabled when the p-type transistor receives a voltage level on its gate terminal that is at least a threshold voltage below a voltage level on its source terminal such as the logic low level. The p-type transistor is negated when the p-type transistor receives a voltage level on its gate terminal that is at least a threshold voltage above a voltage level on its source terminal such as the logic high level. In one example, when the write valid signal of the write transfer channel in a state that indicates the source has no write request that is ready to be sent from the source to the destination for servicing, this write valid signal of the write transfer channel is negated. When the write ready signal of the write transfer channel is in a state that indicates the destination is not ready to service a write request, the write ready signal of the write transfer channel is negated. The control signals of the read transfer channel are negated in a similar manner.

In the following description, the logic high level is used to describe a signal as being asserted, and the logic low level is used to describe a signal as being negated. However, in other implementations, the opposite polarity can be used. The write transfer channel 210 determines when a write operation can begin between the source and the destination. The source drives the write address 212 signals (or write address 212) and the write valid 214 signal (or write valid 214). The destination drives the write ready 216. In some implementations, the source also sends the write address 212 with the write valid 214. In other implementations, the source sends the write address 212 as part of the write data transaction channel 220, and sends a write identifier (ID) as part of the write transfer channel 210.

When the destination receives an asserted value of write valid 214, circuitry within the destination determines when the destination is able to service a corresponding write operation. For example, the destination checks the status of current operations being serviced and the status of any other outstanding operations. When the destination is able to service the corresponding write operation, the destination sends an asserted write ready 216 to the source. In the shown example, the source asserts the write valid 214 in clock cycle 2. Additionally, the source sends the corresponding write address 212 to the destination in clock cycle 2. The destination responds by asserting the write ready 216 in clock cycle 3. Therefore, in clock cycle 4, each of the source and the destination is able to negate the values on the write address 212, the write valid 214 and the write ready 216. These steps complete the handshake sequence between the source and the destination for initiating a write operation.

After the above sequence completes, the source sends write data to the destination on the write data transaction channel 220. The first event of the sequence of events for the write operation is the destination asserts the write data ready 226. Depending on the communication protocol, the source waits no clock cycles (or cycles), or waits a predetermined number of cycles before sending an asserted write data valid 224 along with data values on write data 222. Here, the destination sends the asserted write data ready 226 in cycle 5, and in response, the source sends, in cycle 6, the asserted write data valid 224 and the first data word. In this example, the source sends 3 data words. In some implementations, the source sends an indication of the number of data words in the write transfer channel 210 along with the write address 212. In other implementations, the source sends the indication of the number of data words in metadata along with the asserted write data valid 224. All combinations of sending the indication are possible and contemplated.

The source sends two more data words in cycles 7 and 10, and asserts the write data valid 224 in these cycles. The source also asserts the write data last 228 in cycle 10 while the last data words is sent to the destination. The destination uses the write response transaction channel 230 to confirm the write operation has completed. The destination asserts the write response ready 236, and later, the destination asserts the write response valid 234. As shown, the destination asserts write response ready 236 in cycle 10 and asserts write response valid 234 in cycle 11 although a later cycle is also possible.

Additionally, in cycle 11, the destination sends a status of the write operation in write response 232. One example of the status is "okay," or another indication specifying the write operation completed successfully. Another example is "error," or another indication specifying that the write operation was unsuccessful. An error code can also be sent by the destination to the source. In such a write operation, the communication protocol between the source and the destination supports a burst-based protocol that sends multiple data words in a single write operation using a single address that is associated with burst length information. If the destination determines that any of the data words contain an error, in an implementation, the destination waits until the entire burst has completed before the destination informs the source of the error.

Returning to the write transfer channel 210, as shown in the above example, the source asserts the write valid 214 in cycle 2. Accordingly, the destination is made aware of a pending write operation to service. However, if the destination determines the write valid 214 remains negated for a threshold period of time, the destination autonomously powers down one or more components of the destination to the non-operational state that stops servicing requests. For example, the destination selects a lower performance P-state for the one or more components of the destination. Alternatively, the destination directs one or more components of the destination to transition to one of multiple sleep states, and the destination disables one or more clocks signals used by the destination in one or more of these sleep states.

Additionally, the destination maintains a negated value on write ready 216. Therefore, when the destination is in a lower power state and the source asserts the write valid 214, the destination is able to take a longer time to select a higher performance P-state for one or more components of the destination before responding with an asserted write ready 216. In the meantime, the source continues to store information corresponding to the pending write operation. No data corruption occurs while the destination reduces power consumption of the computing system. Further, no external power manager is used and no additional signals, such as extensions or sideband signals, are used. Rather, the reduced power consumption is achieved using the already-present signals such as the write valid 214 and write ready 216. In various implementations, these two signals already exist in the supported communication protocol.

Further, if the source determines the write ready 216 remains negated for a threshold period of time, the source autonomously reduces the generation of write operations to be serviced by the destination. The source is able to perform similar steps as described above for the destination to reduce the generation of requests to send to the destination and also reduce power consumption. In other words, the source fences the requests that are to be serviced by the destination. Each of the source and the destination includes the ability to power up again without relying on one another. In one example, the destination receives input signals from other sources. In an implementation, the source is a video decoder and the destination is a memory management hub (or hub) that interfaces with a memory controller. The memory controller instructs the hub when the hub is needed and when the memory controller is powering down. When powered down, if the video decoder has no work for the hub, then after the threshold period of time, the hub also powers down autonomously using the write valid 214 and write ready 216. In some implementations, when determining to power down, the destination combines the write valid 214 with a similar read valid signal from the source. For example, the destination does not power down until no write operations and no read operations are received from the source for a threshold period of time.

Figure 3:
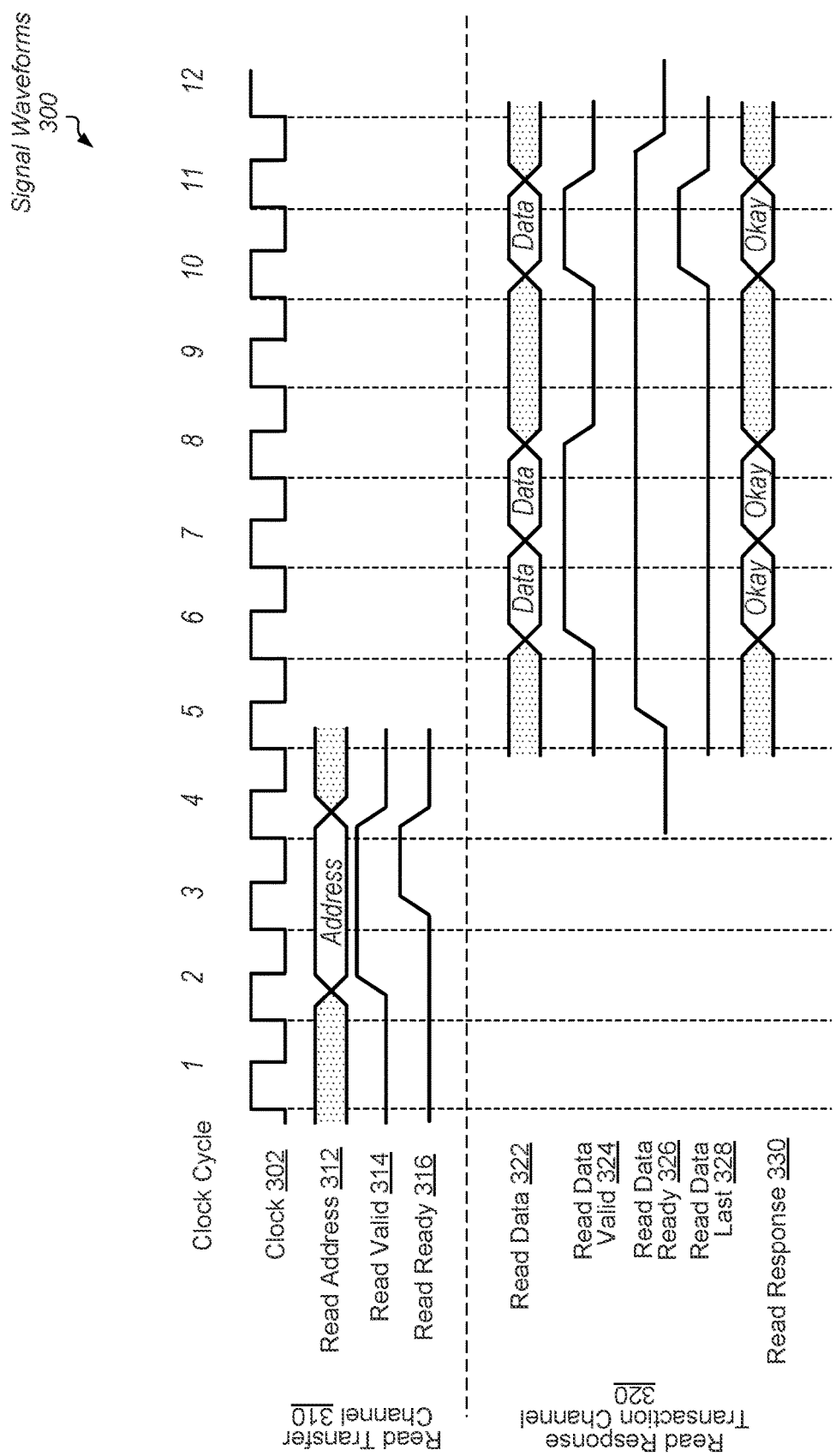
FIG. 3 is a generalized diagram of one implementation of signal waveforms of a read operation according to a communication protocol for channels.

Referring now to FIG. 3, a generalized block diagram of one implementation of signal waveforms 300 of a read operation according to a communication protocol for channels is shown. The signal waveforms 300 illustrate signal types and signal transitions supported by a communication protocol implementing read operations between a source (or an initiator) and a destination (or a completer). The clock 302 is a clock signal with a frequency set by the communication protocol and the corresponding clock cycles are used to control timing between events. The signal waveforms 300 include a read transfer channel 310 and a read response transaction channel 320. The events of the read response transaction channel 320 are not initiated until the read ready 316 signal of the read transfer channel 310 is asserted.

When the destination receives an asserted value of read valid 314, circuitry within the destination determines when the destination is able to service a corresponding read operation. When the destination is able to service the corresponding read operation, the destination sends an asserted read ready 316 to the source. In the shown example, the source asserts the read valid 314 in cycle 2. Additionally, the source sends the corresponding read address 312 to the destination in cycle 2. The destination responds by asserting the read ready 316 in cycle 3. Therefore, in cycle 4, each of the source and the destination is able to negate the values on the read address 312, the read valid 314 and the read ready 316. These steps complete the handshake sequence between the source and the destination for initiating a read operation.

After the above sequence completes, the destination sends read data to the source on the read response transaction channel 320. Similar to the write operation described earlier, the destination sends the asserted read data ready 326 in cycle 5, and sends, in cycle 6, the asserted read data valid 324 and the first data word. Additionally, the destination sends a status of the read operation for the first data words on read response 330. In the example, the source requests 3 data words, and the destination sends the following two data words in cycles 7 and 10. The destination asserts the read data last 328 in cycle 10, and negates the read data ready 326 in cycle 11. Similar to the write operation, depending on the communication protocol, a predetermined number of cycles are inserted between the assertion of particular control signals and the indication of the number of data words to read is inserted in either one of the read transfer channel 310 and the read response transaction channel 320.

Returning to the read transfer channel 310, as shown in the above example, the source asserts the read valid 314 in cycle 2. Accordingly, the destination is made aware of a pending read operation to service. However, if the destination determines the read valid 314 remains negated for a threshold period of time, the destination autonomously powers down one or more components of the destination to the non-operational state that stops servicing requests. For example, the destination selects a lower performance P-state for the one or more components of the destination. Alternatively, the destination directs one or more components of the destination to transition to an idle or sleep state, and the destination disables one or more clocks signals used by the destination. Additionally, the destination maintains a negated value on read ready 316. If the source determines the read ready 316 remains negated for a threshold period of time, the source autonomously reduces the generation of read operations to be serviced by the destination. Each of the source and the destination is able to autonomously reduce the P-state of one or more associated components as described earlier.

Figure 4:
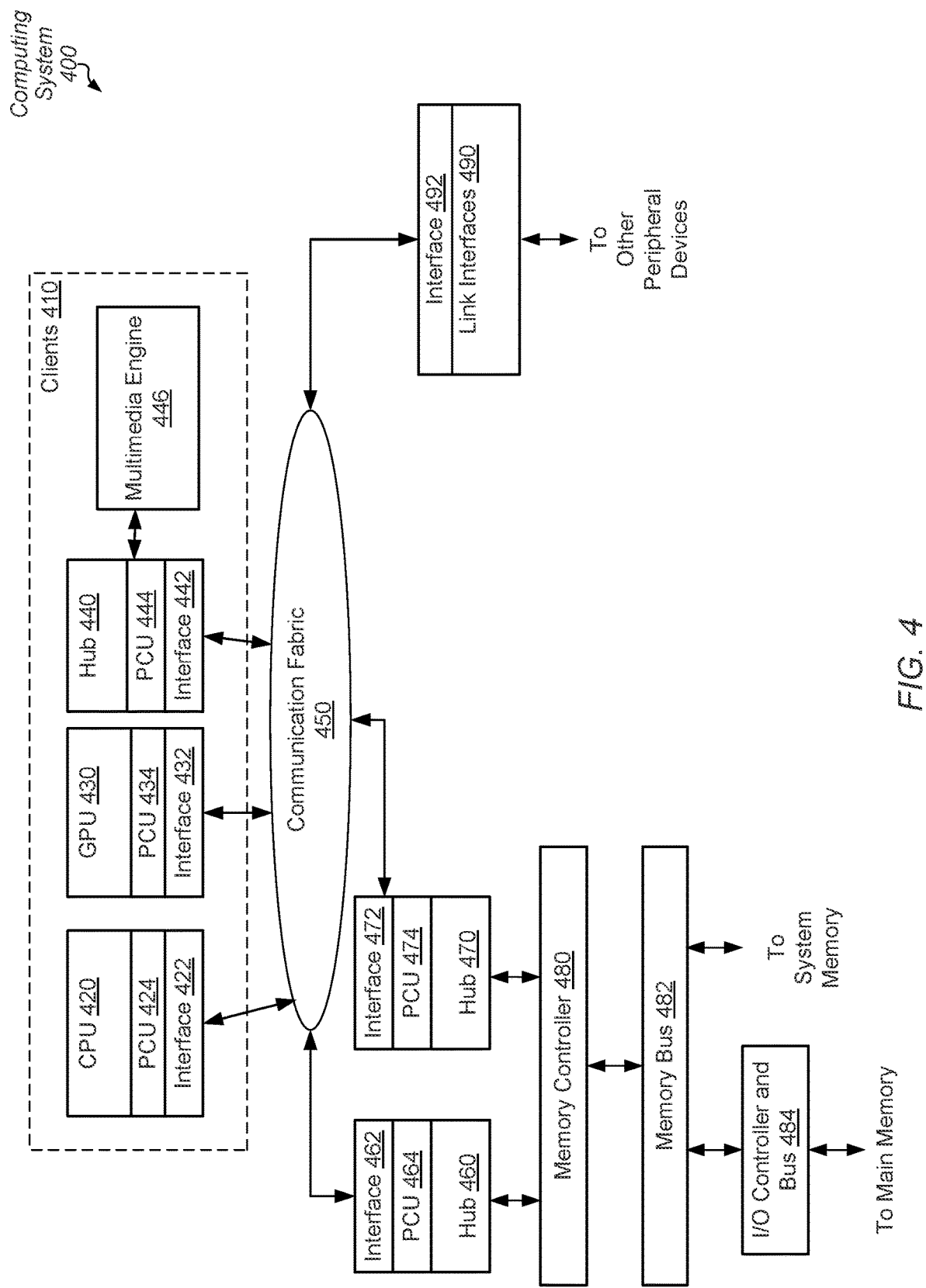
FIG. 4 is a generalized diagram of one implementation of a computing system.

Turning to FIG. 4, a generalized block diagram of one implementation of a computing system 400 is shown. As shown, computing system 400 includes communication fabric 450 between each of clients 410, memory controller 480, and link interfaces 490. In some implementations, the components of processing node 400 are individual dies on an integrated circuit (IC), such as a system-on-a-chip (SOC). In other implementations, the components are individual dies in a system-in-package (SiP) or a multi-chip module (MCM).

In the illustrated implementation, clients 410 include central processing unit (CPU) 420, graphics processing unit (GPU) 430 and Hub 440. Hub 440 is used for communicating with Multimedia Engine 446. The CPU 420, GPU 430 and Multimedia Engine 446 are examples of computing resources capable of processing applications. Although not shown, in other implementations, other types of computing resources are included in clients 410. Each of the one or more processor cores in CPU 420 includes circuitry for executing instructions according to a given selected instruction set architecture (ISA). In various implementations, each of the processor cores in CPU 420 includes a superscalar, multi-threaded microarchitecture used for processing instructions of the given ISA. In an implementation, GPU 430 includes a high parallel data microarchitecture with a significant number of parallel execution lanes. In one implementation, the microarchitecture uses single-instruction-multiple-data (SIMD) pipeline for the parallel execution lanes. Multimedia Engine 446 includes processors for processing audio data and visual data for multimedia applications.

Although a single memory controller 480 is shown, in other implementations, another number of memory controllers are used in computing system 400. In various implementations, memory controller 480 receives memory requests from clients 410 via the fabric 450, schedules the memory requests, and sends the scheduled memory requests to one or more of system memory and main memory. Memory controller 480 also receives responses from system memory and main memory and sends the responses to a corresponding source of the request in clients 410. In various implementations, system memory is filled with data from main memory through the I/O controller and bus 482 and the memory bus 482. A corresponding cache fill line with the requested block is conveyed from main memory to a corresponding one of the cache memory subsystems in clients 410 in order to complete the original memory request. The cache fill line is placed in one or more levels of caches.

In some implementations, the address space of the computing system 400 is divided among at least CPU 420, GPU 430 and Hub 440 and one or more other components such as input/output (I/O) peripheral devices (not shown) and other types peripheral devices accessed via link interfaces 490. Memory maps are maintained for determining which addresses are mapped to which component, and hence to which one of CPU 420, GPU 430 and Hub 440 a memory request for a particular address should be routed. In an implementation, system memory is one of a variety of dynamic random access memory (DRAM) and a corresponding protocol is supported by memory controller 480. In some implementations, main memory is one of a variety of types of non-volatile, random access secondary storage of data. Examples of main memory are hard disk drives (HDDs) and solid-state disks (SSDs). Similar to Hub 440 used for communicating with Multimedia Engine 446, the Hubs 460 and 470 are used for communicating with the memory controller 480.

In various implementations, communication fabric 450 (or fabric 450) transfers data back and forth between clients 410, memory controller 480, and other peripheral devices via link interfaces 490. The data being transferred through fabric 450 includes data such as commands, messages, probes, interrupts, and data corresponding to the commands and messages. In some implementations, fabric 450 includes at least queues for storing requests and responses, selection logic for arbitrating between received requests before sending requests across an internal network, logic for building and decoding packets, and logic for selecting routes for the packets.

As shown, the Clients 410, the Hubs 460 and 470, and the link interfaces 490 include interfaces for supporting respective communication protocols. For example, CPU 420 includes Interface 422, GPU 430 includes Interface 432, Hub 440 includes Interface 442, and so on. In some implementations, the transmission lines of these Interfaces connected to the fabric 450 are point-to-point communication channels. At the physical level, a link includes one or more lanes. In some implementations, the Interfaces 422, 432, 442, 462, 472 and 492 support a communication protocol such as the Advanced eXtensible Interface (AXI) protocol of the Arm Advanced Microcontroller Bus Architecture (AMBA) on-chip interconnect specification. It is possible and contemplated that these Interfaces support other examples of communication protocols. In some implementations, each of these Interfaces includes multiple queues, each for storing packets of a respective type. Additionally, there are multiple queue arbiters, each for selecting a candidate packet from a respective one of the multiple queues.

In addition, the Clients 410 and the Hubs 460 and 470 include power control units (or PCUs) for local power management. For example, CPU 420 includes Power Control Unit 424 (or PCU 424), GPU 430 includes PCU 434, Hub 440 includes PCU 444, Hub 460 includes PCU 464, and Hub 470 includes PCU 474. The PCU selects a respective power-performance state (P-state) for a corresponding unit and/or selects an idle or sleep state. In various implementations, the PCUs monitor signals of a transfer channel supported by a corresponding Interface. For example, the PCUs monitor a valid signal and a ready signal of the transfer channel. Referring briefly again to FIGS. 2 and 3, examples of these signals are the write valid 214 and write ready 216 of the write transfer channel 210 as well as the read valid 314 and read ready 316 of the read transfer channel 310. The PCUs autonomously select the P-states of a corresponding unit based on these monitored signals. The PCUs do not communicate with a centralized power manager to select the P-states. In one example, the Multimedia Engine 446 includes a video decoder and accesses system memory via Hub 470. The Interface 442 acts as an interface for a source, such as interface 116 of source 110 of FIG. 1), and the Interface 472 acts as an interface for a destination such as interface 146 of destination 140 (of FIG. 1).

Methods 500-800 described below are used for interfaces of a source and a destination. The source generates requests and the destination services the requests. The interfaces of the source and the destination support a communication protocol for signals transferred between them. In various implementations, the communication protocol includes both a transfer channel and one or more transaction channels for each type of request. For example, write requests use a write transfer channel, a write data transaction channel, and a write response transaction channel. Read requests use a read transfer channel and a read response transaction channel. In some implementations, the example of the communication protocol is the Advanced eXtensible Interface (AXI) protocol of the Arm Advanced Microcontroller Bus Architecture (AMBA) on-chip interconnect specification. It is possible and contemplated that the source and the destination support other examples of communication protocols. Any of the apparatuses, processing units and systems described earlier can be used to implement the steps of methods 500-800. Methods 500-800 describe steps performed by the source and destination to autonomously reduce power consumption. A further description of these steps is provided in the below discussion.

Figure 5:
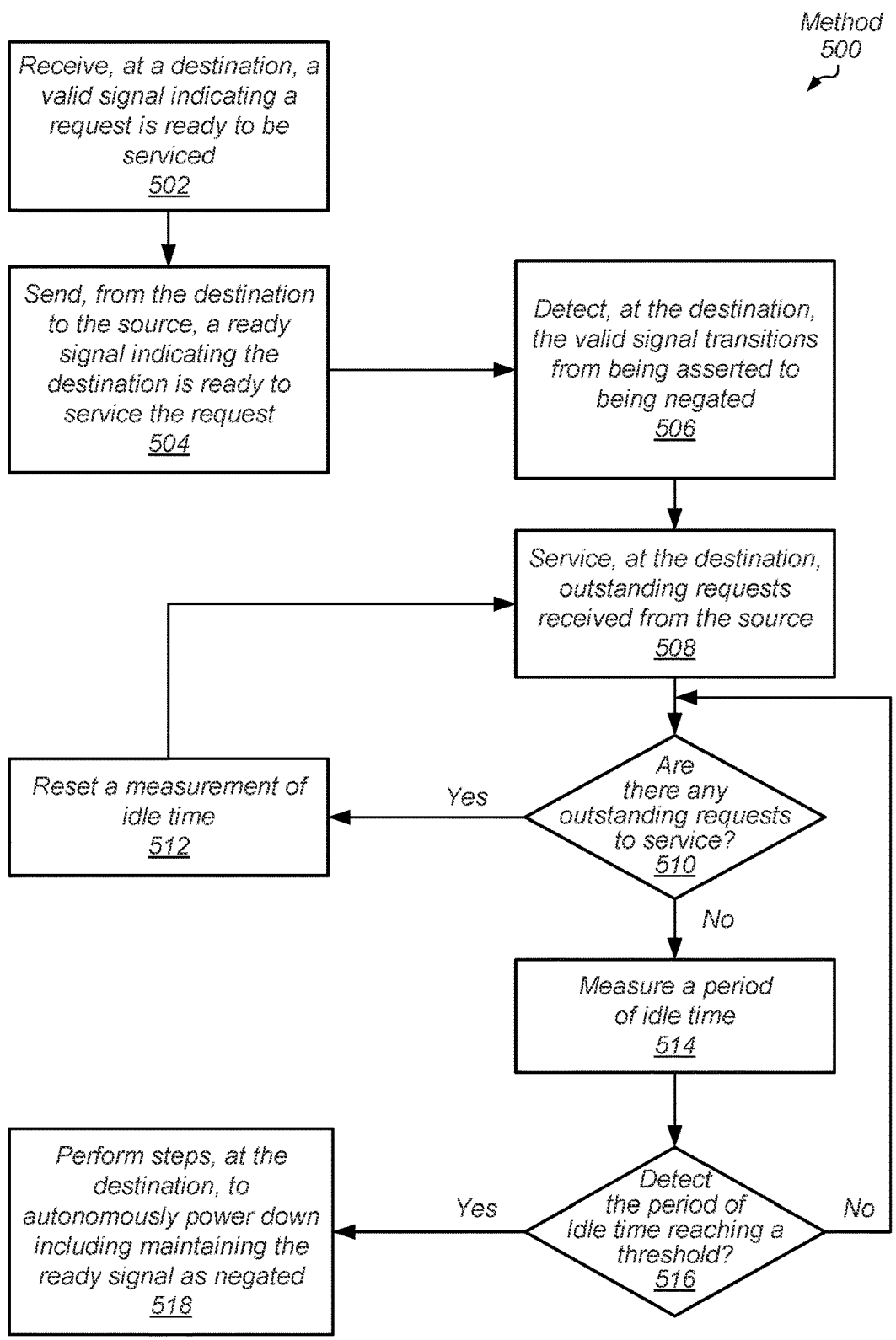
FIG. 5 is a generalized diagram of one implementation of a method for efficiently performing an autonomous power down of destination circuitry.

Referring now to FIG. 5, one implementation of a method 500 for efficiently performing an autonomous power down of destination circuitry is shown. For purposes of discussion, the steps in this implementation (as well as in FIGS. 6-8) are shown in sequential order. However, in other implementations some steps occur in a different order than shown, some steps are performed concurrently, some steps are combined with other steps, and some steps are absent.

The destination receives a valid signal that is in a state that indicates a request from the source is ready to be serviced (block 502). For example, the valid signal is asserted. The destination sends to the source a ready signal in a state that indicates the destination is ready to service the request (block 504). For example, the ready signal is asserted. The destination detects the valid signal from the source transitions from being asserted to being negated (block 506). The destination services outstanding requests received from the source (block 508). If there are any outstanding requests to service ("yes" branch of the conditional block 510), then the destination resets a measurement of idle time (block 512).

If there are no outstanding requests to service ("no" branch of the conditional block 510), then the destination measures a period of idle time (block 514). If the destination does not detect the period of idle time reaches a threshold ("no" branch of the conditional block 516), then control flow of method 500 returns to conditional block 510 where it is determined whether there are any outstanding requests to service. If the destination detects the period of time reaches the threshold ("yes" branch of the conditional block 516), then the destination performs steps to autonomously power down to the non-operational state that stops servicing requests (block 518). Additionally, the destination maintains the ready signal as negated.

Figure 6:
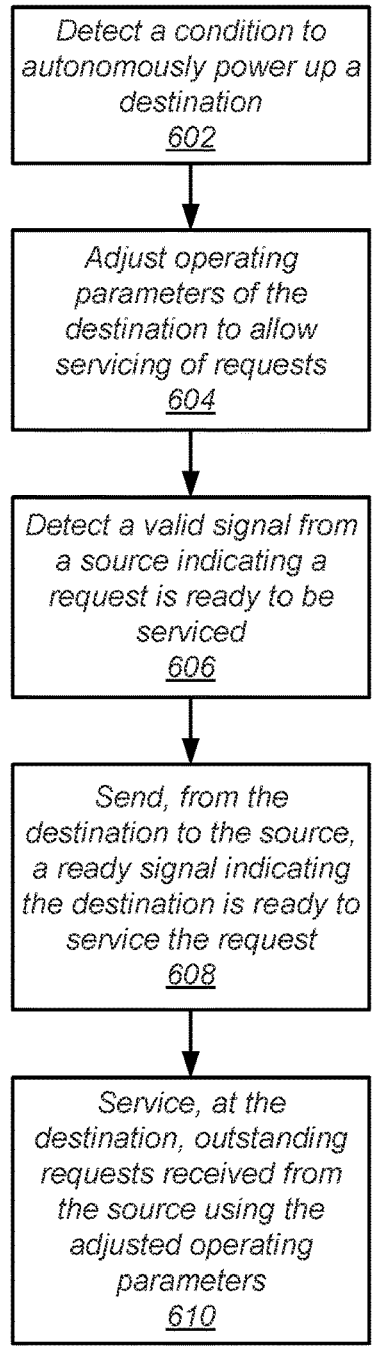
FIG. 6 is a generalized diagram of one implementation of a method for efficiently performing an autonomous power up of destination circuitry.

Turning to FIG. 6, one implementation of a method 600 for efficiently performing an autonomous power up of destination circuitry is shown. A destination that is powered down detects a condition to autonomously power up (block 602). In some implementations, determining a power up condition has occurred includes determining a number of received requests exceeds a threshold or a request of a particular type is received at an interface of the destination. In response, the destination autonomously powers up to the operational state that allows servicing of requests. For example, the interface sends an indication to a local power control unit of the destination that specifies the components of the destination should transition to a higher performance P-state from a lower performance P-state or from one of multiple sleep states. The destination adjusts operating parameters of the destination to allow servicing of requests (block 604). The operating parameters include at least an operating voltage and an operating clock frequency. The destination detects a valid signal from a source indicating a request is ready to be serviced (block 606). The destination sends to the source a ready signal indicating the destination is ready to service the request (block 608). The destination services outstanding requests received from the source using the adjusted operating parameters (block 610).

Figure 7:
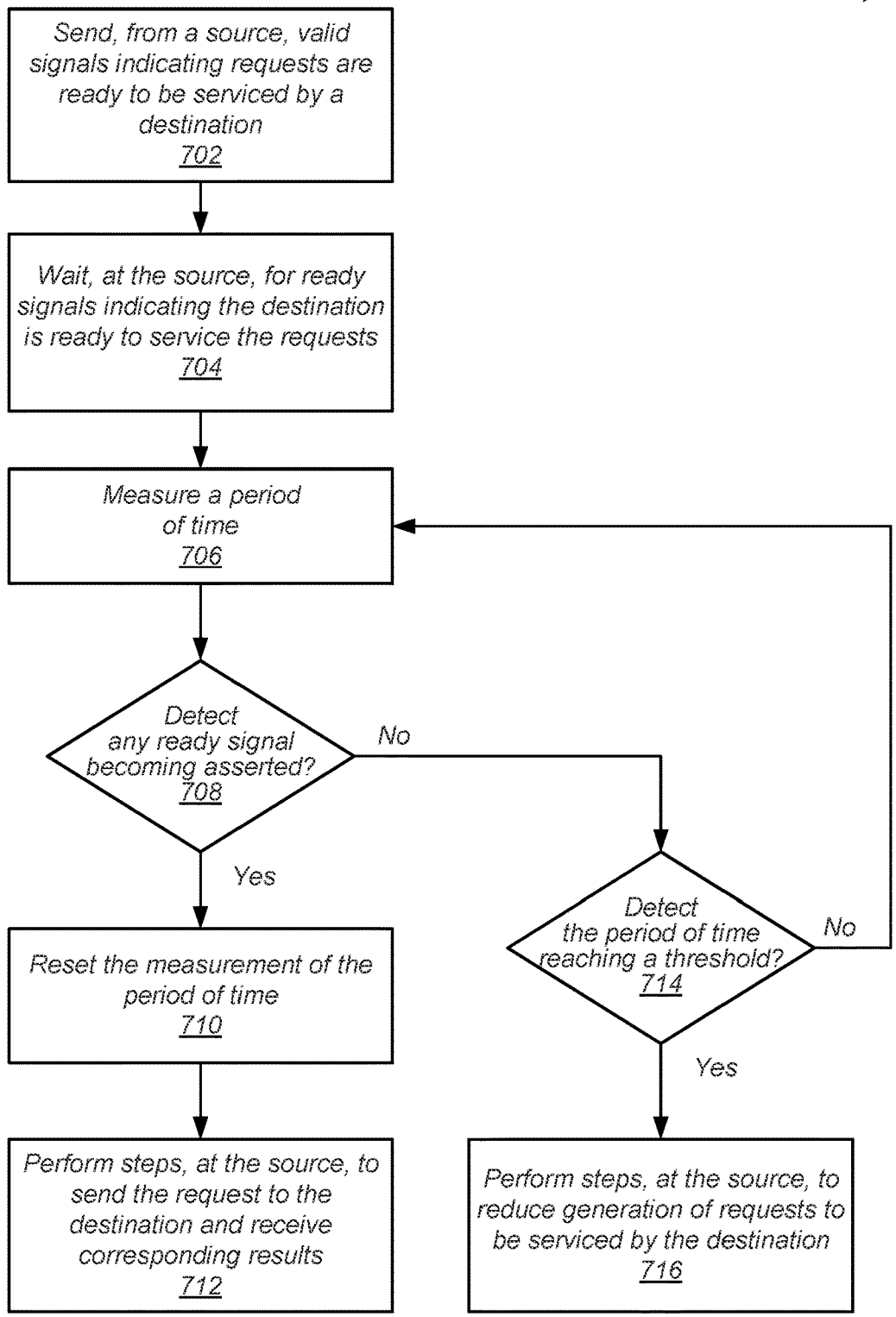
FIG. 7 is a generalized diagram of one implementation of a method for efficiently performing an autonomous power down of source circuitry.

Referring now to FIG. 7, one implementation of a method 700 for efficiently performing an autonomous power down of source circuitry is shown. The source sends valid signals of transfer channels to the destination indicating requests are ready to be serviced by the destination (block 702). For example, the source sends an asserted value of one or more of the write valid signal of the write transfer channel and the read valid signal of the read transfer channel to the destination. The source waits for any of the ready signals of the transfer channels to be set in a state that indicates the destination is ready to service requests (block 704). The source measures a period of time (block 706). If the source detects any ready signal of the transfer channels becoming asserted ("yes" branch of the conditional block 708), then the source resets the measurement of the period of time (block 710). The source performs steps to send one or more requests to the destination and receive corresponding results (block 712). For example, the source follows the timing of control signals of the supported communication protocol.

If the source detects no ready signal of the transfer channels becoming asserted ("no" branch of the conditional block 708), and the source does not determine the period of time reaches a threshold ("no" branch of the conditional block 714), then control flow of method 700 returns to block 706 where the source measures the period of time. If the source detects no ready signal of the transfer channels becoming asserted ("no" branch of the conditional block 708), and the source determines the period of time reaches a threshold ("yes" branch of the conditional block 714), then the source perform steps to reduce generation of requests to be serviced by the destination (block 716). In various implementations, the source performs these steps autonomously. For example, the source selects a lower performance P-state of one or more components without notifying an external power manager or waiting for permission from the external power manager.

Figure 8:
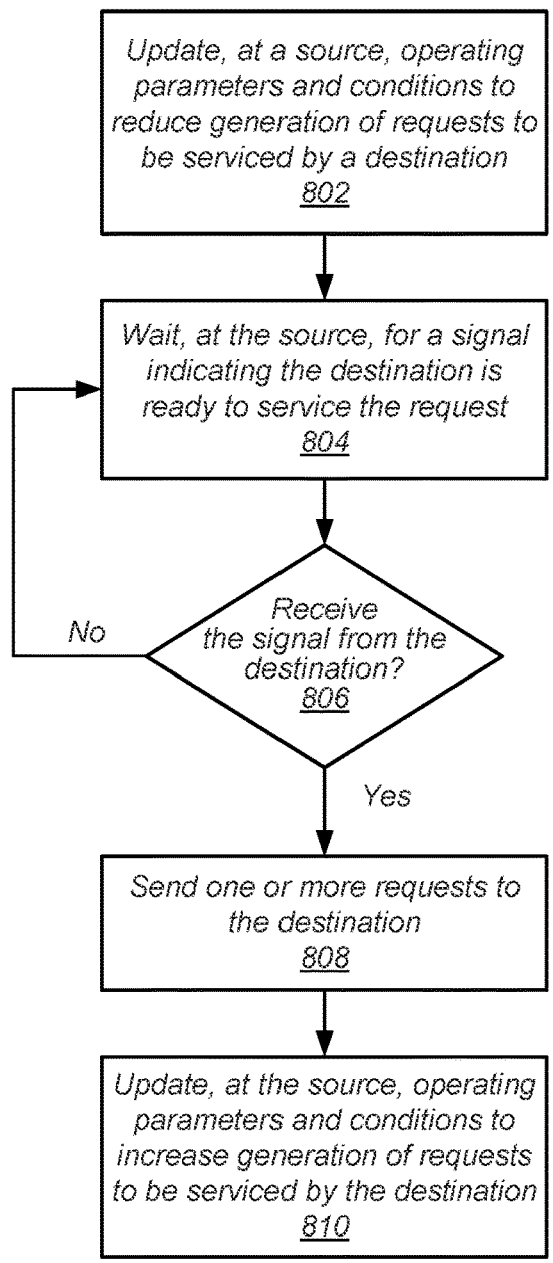
FIG. 8 is a generalized diagram of one implementation of a method for efficiently performing an autonomous power up of source circuitry.

Turning to FIG. 8, one implementation of a method 800 for efficiently performing an autonomous power up of source circuitry is shown. The source updates operating parameters and conditions to reduce generation of requests to be serviced by a destination (block 802). In various implementations, the source performs these updates autonomously. The source waits for a signal indicating the destination is ready to service the request (block 804). For example, the source waits for any of the ready signals of the transfer channels to be set in a state that indicates the destination is ready to service requests. If the source does not receive this signal ("no" branch of the conditional block 806), then control flow of method 800 returns to block 804 where the source waits while handling other outstanding tasks, if any, using the updated operating parameters.

If the source receives the signal indicating the destination is ready to service the request ("yes" branch of the conditional block 806), then the source sends the request to the destination (block 808). The source updates the operating parameters to increase generation of requests to be serviced by the destination (block 810). For example, the source selects a higher performance P-state of one or more components without notifying an external power manager or waiting for permission from the external power manager.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
an interface configured to manage a plurality of transfer channels, each transfer channel comprising a first signal that indicates whether the apparatus is ready to service a request;
a processing circuit configured to service received requests from a source via the interface; and
a power control circuit; and
wherein, based at least in part on an event that causes a change in whether the processing circuit services requests, the power control circuit is configured to:
adjust a power management state of the processing circuit by autonomously performing a power up or a power down of the processing circuit independently of the source or another circuit; and
maintain the first signal of each of the plurality of transfer channels in a state that indicates whether the apparatus is ready to service a request based on the power management state of the processing circuit.

2. The apparatus as recited in claim 1, wherein the interface is further configured to manage, on a plurality of transaction channels different from the plurality of transfer channels, an exchange with the source of one or more of data targeted by a request being serviced and a status of completion of the request.

3. The apparatus as recited in claim 1, wherein based at least in part on the event comprising an idle condition, the power control circuit is further configured to:
autonomously power down the processing circuit to a non-operational state that stops servicing requests; and
maintain the first signal of each of the plurality of transfer channels in a state that indicates the apparatus is not ready to service a request.

4. The apparatus as recited in claim 3, wherein detecting the idle condition has occurred comprises a request of a particular type not being received for a threshold period of time.

5. The apparatus as recited in claim 4, wherein each of the plurality of transfer channels further comprises one of a plurality of second signals that indicates whether the request of the particular type is ready to be sent.

6. The apparatus as recited in claim 1, wherein based at least in part on the event comprising a power up condition, the power control circuit is further configured to:
autonomously power up the processing circuit to an operational state that allows servicing of requests; and
maintain the first signal of each of the plurality of transfer channels in a state that indicates the apparatus is ready to service a request.

7. The apparatus as recited in claim 6, wherein the power up condition comprises a number of received requests exceeds a threshold.

8. A method comprising:
managing, by a destination, a plurality of transfer channels comprising a plurality of first signals, each transfer channel comprising one of the plurality of first signals that indicates whether the destination is ready to service a request;
receiving, by the destination, requests from a source via an interface;
in response to an event has occurred that causes a change in whether the destination services requests:
adjusting a power management state of the destination by autonomously performing a power up or a power down of the destination independently of the source or another circuit; and
maintaining each of the plurality of first signals of the plurality of transfer channels in a state that indicates whether the destination is ready to service a request based on the power management state of the destination.

9. The method as recited in claim 8, wherein, in response to each of the plurality of first signals of the plurality of transfer channels indicate, for a threshold period of time, the destination is not ready to service requests, the method further comprises a source autonomously reducing generation of requests to be serviced by the destination.

10. The method as recited in claim 8, wherein in response to the event that has occurred comprises an idle condition, the method further comprises:
autonomously powering down the destination to a non-operational state that stops servicing requests; and
maintaining each of the plurality of first signals of the plurality of transfer channels in a state that indicates the destination is not ready to service a request.

11. The method as recited in claim 10, wherein the idle condition has occurred comprises a request of a particular type is not ready to be sent to the destination by a source for a threshold period of time.

12. The method as recited in claim 11, wherein each of the plurality of transfer channels further comprises one of a plurality of second signals that indicates whether the request of the particular type is ready to be sent to the destination for servicing.

13. The method as recited in claim 8, wherein in response to the event comprising a power up condition, the method further comprises:
autonomously powering up the destination to an operational state that allows servicing of requests; and
maintaining each of the first signals of the plurality of transfer channels in a state that indicates the destination is ready to service a request.

14. The method as recited in claim 13, wherein the power up condition comprises a number of received requests exceeds a threshold.

15. A computing system comprising:
a destination; and
a plurality of transfer channels comprising a plurality of first signals coupled to the destination, each transfer channel comprising one of the plurality of first signals that indicates whether the destination is ready to service a request;
wherein the destination comprises:
a processing circuit configured to service received requests from a source; and
a power control circuit; and
wherein, based at least in part on an event has occurred that causes a change in whether the processing circuit services requests, the power control circuit is configured to:
adjust a power management state of the processing circuit by autonomously performing a power up or a power down of the processing circuit independently of the source or another circuit; and
maintain each of the plurality of first signals of the plurality of transfer channels in a state that indicates whether the processing circuit is ready to service a request based on the power management state of the processing circuit.

16. The computing system as recited in claim 15, wherein based at least in part on the event that has occurred comprises an idle condition, the power control circuit is further configured to:
autonomously power down the processing circuit to a non-operational state that stops servicing requests; and
maintain each of the plurality of first signals of the plurality of transfer channels in a state that indicates the destination is not ready to service a request.

17. The computing system as recited in claim 16, wherein the idle condition has occurred comprises a request of a particular type is not ready to be sent from a source to the destination for a threshold period of time.

18. The computing system as recited in claim 17, wherein each of the plurality of transfer channels further comprises one of a plurality of second signals that indicates whether the request of the particular type is ready to be sent to the destination for servicing.

19. The computing system as recited in claim 15, wherein based at least in part on the event has occurred comprises a power up condition, the power control circuit is further configured to:
autonomously power up the processing circuit to an operational state that allows servicing of requests; and
maintain each of the first signals of the plurality of transfer channels in a state that indicates the destination is ready to service a request.

20. The computing system as recited in claim 19, wherein the power up condition comprises a number of received requests exceeds a threshold.

* * * * *